(12) United States Patent
Weingartz et al.

(10) Patent No.: US 8,560,192 B2
(45) Date of Patent: Oct. 15, 2013

(54) CONTROL SYSTEM AND METHOD FOR SHIFT FORK POSITION IN DUAL CLUTCH TRANSMISSIONS

(75) Inventors: Christopher Jay Weingartz, Holly, MI (US); Steven P. Moorman, Dexter, MI (US); Xuefeng Tim Tao, Northville, MI (US); Chinar S. Ghike, Livonia, MI (US); Andreas Gustavsson, Lidkoping (SE)

(73) Assignee: GM Global Technology Operations LLC

( * ) Notice: Subject to any disclaimer, the term of this patent is extended or adjusted under 35 U.S.C. 154(b) by 268 days.

(21) Appl. No.: 12/850,083

(22) Filed: Aug. 4, 2010

(65) Prior Publication Data

US 2011/0257855 A1 Oct. 20, 2011

Related U.S. Application Data

(60) Provisional application No. 61/324,524, filed on Apr. 15, 2010.

(51) Int. Cl.
*G06F 7/00* (2006.01)

(52) U.S. Cl.
USPC .............................. 701/58; 74/336 R; 477/906

(58) Field of Classification Search
USPC ....................... 701/58, 67; 477/906; 74/336 R
See application file for complete search history.

(56) References Cited

U.S. PATENT DOCUMENTS

| 5,046,174 A | 9/1991 | Lentz et al. |
|---|---|---|
| 5,072,390 A | 12/1991 | Lentz et al. |
| 5,417,402 A * | 5/1995 | Speybroeck ............... 251/30.01 |
| 5,683,329 A | 11/1997 | Kono et al. |
| 5,890,392 A | 4/1999 | Ludanek et al. |
| 5,993,350 A | 11/1999 | Lawrie et al. |
| 6,070,117 A * | 5/2000 | Yamada et al. .................. 701/50 |
| 6,164,149 A * | 12/2000 | Ohmori et al. .............. 74/336 R |
| 6,253,140 B1 | 6/2001 | Jain et al. |
| 6,276,224 B1 * | 8/2001 | Ueda et al. ...................... 74/335 |
| 6,568,515 B2 * | 5/2003 | Harries ........................ 192/3.58 |
| 6,619,152 B2 * | 9/2003 | Ochi et al. ...................... 74/335 |
| 6,694,834 B2 | 2/2004 | Bansbach et al. |
| 6,997,849 B2 * | 2/2006 | Stasik et al. .................... 477/78 |
| 7,228,216 B2 * | 6/2007 | Inoue .............................. 701/67 |
| 7,682,285 B2 | 3/2010 | Kraska et al. |

(Continued)

OTHER PUBLICATIONS

U.S. Appl. No. 12/850,159, filed Aug. 4, 2010, Weingartz et al.

(Continued)

*Primary Examiner* — Thomas G. Black
*Assistant Examiner* — Shardul Patel (57) ABSTRACT

A control system includes a pressure control solenoid and a flow control solenoid having an input in fluid communication with the pressure control solenoid. A piston adjusts a position of a shift fork and includes a first area in fluid communication with the pressure control solenoid and a second area in fluid communication with the flow control solenoid. A fork sensor senses a position of a shift fork. A flow determining module determines a fork velocity for the shift fork, adjusts the fork velocity to generate an adjusted fork velocity based on the position, and generates a flow command for the flow control solenoid based on the adjusted fork velocity. A pressure determining module generates a pressure command for the pressure control solenoid. The shift fork is at least one of moved from a sync position to an engaged position and from an engaged position to a neutral position.

20 Claims, 6 Drawing Sheets

(56) References Cited

U.S. PATENT DOCUMENTS

| | | |
|---|---|---|
| 7,706,949 B2 | 4/2010 | Sah et al. |
| 7,757,577 B2 * | 7/2010 | Kawamoto et al. ............. 74/335 |
| 8,079,936 B2 | 12/2011 | MacFarlane et al. |
| 2002/0014130 A1 * | 2/2002 | Ogami et al. .................... 74/335 |
| 2004/0121873 A1 | 6/2004 | Bansbach et al. |
| 2005/0107214 A1 | 5/2005 | Koenig |
| 2005/0132832 A1 * | 6/2005 | Yasui et al. ..................... 74/335 |
| 2008/0161159 A1 | 7/2008 | Runde et al. |
| 2008/0202853 A1 * | 8/2008 | Ogami ........................ 184/6.12 |
| 2008/0210032 A1 | 9/2008 | Uberti et al. |
| 2008/0234105 A1 | 9/2008 | Sakamoto et al. |
| 2009/0118082 A1 | 5/2009 | Heap et al. |
| 2009/0165584 A1 * | 7/2009 | Ishii ............................. 74/336 R |
| 2009/0211862 A1 | 8/2009 | Moorman et al. |
| 2009/0247358 A1 | 10/2009 | Kojima et al. |
| 2011/0168510 A1 * | 7/2011 | Lundberg et al. ............ 192/3.51 |

OTHER PUBLICATIONS

U.S. Appl. No. 12/850,096, filed Aug. 4, 2010, Weingartz et al.

* cited by examiner

CONTROL SYSTEM AND METHOD FOR SHIFT FORK POSITION IN DUAL CLUTCH TRANSMISSIONS

CROSS REFERENCE TO RELATED APPLICATIONS

This application claims the benefit of U.S. Provisional Application No. 61/324,524, filed on Apr. 15, 2010, which is hereby incorporated by reference in its entirety.

This application is related to U.S. patent application Ser. Nos. 12/850,159 filed on Aug. 4, 2010, and 12/850,096 filed on Aug. 4, 2010. The disclosures of the above applications are incorporated herein by reference in their entirety.

FIELD

The present disclosure relates to dual clutch transmissions, and more particularly to control systems and methods for positioning shift forks in dual clutch transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When a driver changes from one gear to another in a vehicle with a manual transmission, the driver depresses a clutch pedal. The clutch disconnects the engine and interrupts power flow from the engine to the manual transmission. Then the driver uses a manual stick shift to select another gear. The manual stick shift is connected by a mechanical linkage assembly to shift forks. The shift forks move gear selectors, which deselect one gear and select another gear.

The gear selectors may include synchronizers to match a speed of the gear selector to the gear to prevent grinding. Once the new gear is engaged, the driver releases the clutch pedal to re-connect the engine and transmit power to the wheels.

As can be appreciated, manual transmissions do not provide a continuous flow of power. Instead, power delivery changes from on to off (when the clutch is disengaged) and from off to on (when the clutch is engaged and the transmission is in gear). As can be appreciated, a loss of efficiency and reduced performance occurs during periods when the manual transmission is disengaged. Furthermore, the on/off nature of power delivery can be annoying.

A dual-clutch transmission (DCT) uses two clutches but does not include a clutch pedal. One clutch may be used to control a first subset of gears (such as first, third, and fifth) while the other clutch may be used to control a second subset of the gears (such as second, fourth and sixth). Using this arrangement, a different gear can be preselected before the shift to prevent interruption in power flow. As a result, efficiency and performance is improved.

A powertrain control module and a hydraulic control system may be used to control operation of the clutches, shift forks and gear selectors. It is difficult to control the shift forks during synchronization and engagement or disengagement of the gear selectors. As a result, some DCTs may generate a banging noise when shifting. Furthermore, a significant amount of time and effort may be needed to calibrate the system to shift with acceptable shift quality and speed.

SUMMARY

A control system includes a pressure control solenoid and a flow control solenoid having an input in fluid communication with the pressure control solenoid. A piston adjusts a position of a shift fork and includes a first area in fluid communication with the pressure control solenoid and a second area in fluid communication with the flow control solenoid. A fork sensor senses a position of the shift fork. A flow determining module determines a fork velocity for the shift fork, adjusts the fork velocity to generate an adjusted fork velocity based on sensed fork position, and generates a flow command for the flow control solenoid based on the adjusted fork velocity. A pressure determining module generates a pressure command for the pressure control solenoid.

In other features, after the position of the shift fork is within a predetermined distance of a desired fork position, the pressure determining module ramps the pressure command to zero at a predetermined rate. The pressure command from the pressure determining module reaches zero before the flow command from the flow determining module. The flow command includes a first portion that ramps to a maximum value, a second portion that is constant at the maximum value, a third portion that ramps at a first rate and a fourth portion that ramps at a second rate that is different than the first rate.

In other features, the pressure determining module includes an error module that generates an error based on a difference between a desired fork position and the position of the shift fork. A comparing module compares the error to a threshold and generates a ramp enable signal. The pressure determining module ramps the pressure command to zero at a predetermined rate in response to the ramp enable signal. The pressure command reaches zero before the flow command. The pressure determining module generates the pressure command based on a maximum fork velocity, at least one of drag and detent forces and fluid characteristics of at least one of the pressure control solenoid and the flow control solenoid. The second area is larger than the first area.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure relates to control systems and methods for controlling shift fork actuators in a dual clutch transmission. Fork actuators may include a two-sided piston with a flow control (FC) solenoid connected to one side. A pressure control (PC) solenoid may be connected to the other side of the piston. The PC solenoid may feed the FC solenoid. During engagement or disengagement events, a shift fork velocity profile is calculated and commanded based on a predetermined period and a difference between the measured fork position and the targeted fork position. The DCT may be a dry clutch DCT or a wet clutch DCT.

Closed loop control based on the measured fork position is used to modify the velocity command. The velocity command is converted to a flow command based on an area of the piston. The pressure command that feeds the FC solenoid and the opposite side of the piston is a function of the commanded fork velocity, the fluid flow characteristics of the FC solenoid, and estimated drag and detent forces.

In some implementations, the two sides of the fork actuator pistons have different areas. The FC solenoid may be connected to a larger one of the two sides. The PC solenoid may be connected to a smaller one of the two sides. The PC solenoid also feeds pressure to the FC solenoid attached to the other side of the fork actuator piston.

During engagement or disengagement of a synchronizer, the shift fork either moves the synchronizer sleeve from a synchronized position to an engaged position or from the engaged position to neutral. This is accomplished by commanding the flow on the larger side of the piston and the pressure on the smaller side. The flow command is based on a velocity command.

The fork is commanded to follow a velocity profile. The velocity profile starts at a velocity of the piston at the beginning of the event and ramps to a maximum velocity. The piston holds the maximum velocity until it ramps down to the final predetermined velocity. The rate at which the velocity ramps to and from maximum velocity are determined by a predetermined percentage of the total time for each event.

Closed loop control is used to modify the velocity command to keep the measured fork velocity on or near the velocity profile. When the difference between the measured fork position and the desired fork position is below a predetermined distance, the velocity command is calculated using closed loop position control rather than the commanded velocity profile. This control calculates the difference between the measured fork position and the targeted fork position to determine error and commands the velocity to bring the error to zero.

The PC solenoid and the FC solenoid are controlled based on the maximum required fork velocity, flow characteristics of the flow control solenoid and control fluid, and the estimated drag and detent forces. When the predetermined fork movement time is decreased, the maximum velocity and therefore the pressure command will increase. This active command of control pressure will ensure that only the needed control pressure will be used and will help to minimize leakage and reduce demand on the pressure accumulator.

When the difference between the measured fork position and targeted fork position is below a predetermined distance, the pressure will ramp to zero. The pressure is intended to reach zero prior to the fork reaching the target position, which allows both sides of the piston to exhaust pressure. The detent is located at the engaged or neutral position to complete the movement and hold the fork in place.

Figure 1:
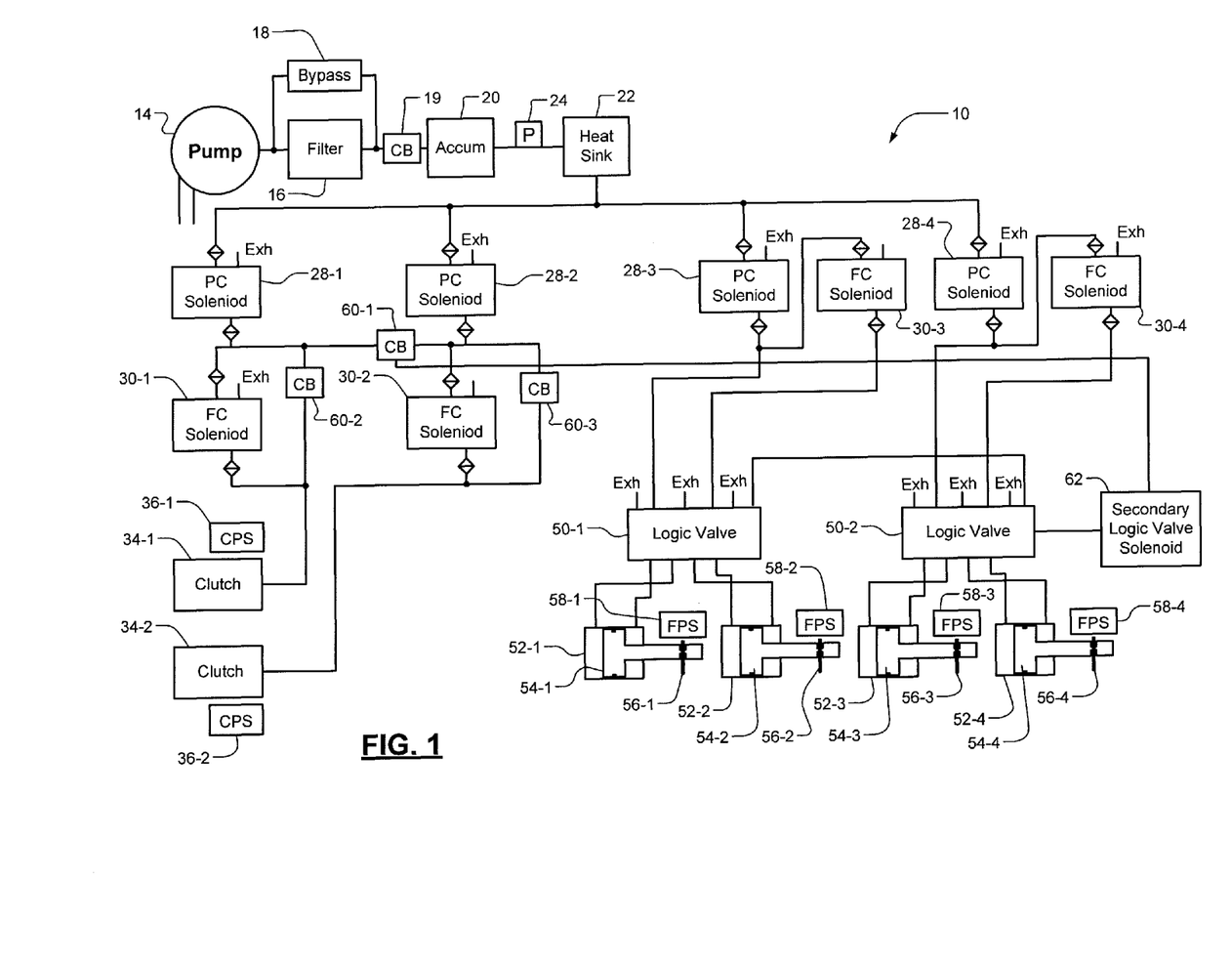
FIGS. 1 and 2 are functional block diagrams of a control system for a dual clutch transmission.
Figure 2:
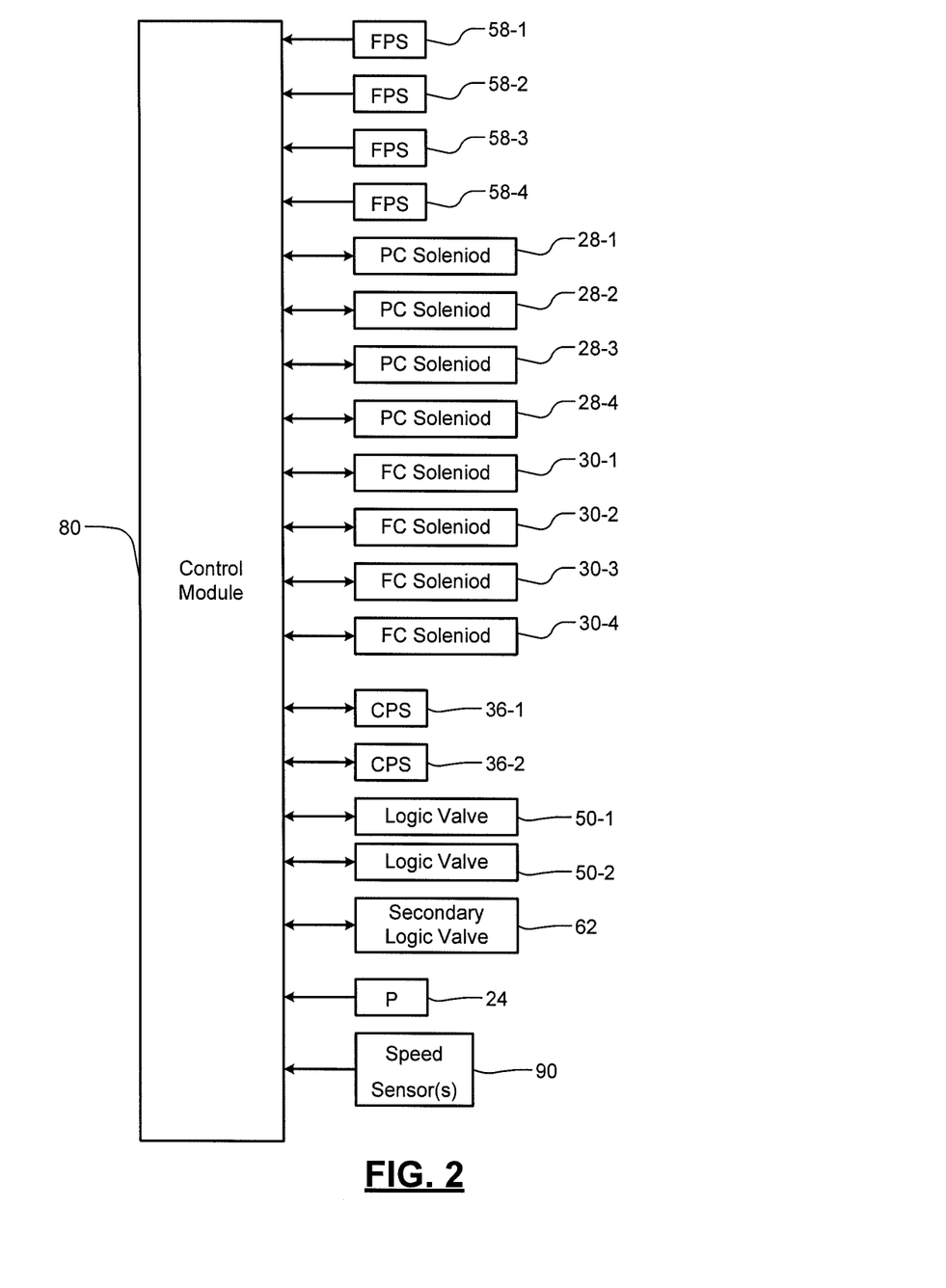

Referring now to FIGS. 1 and 2, an exemplary control system 10 for the DCT is shown. A pump 14 pumps a fluid through a filter 16. A bypass 18 may be provided around the filter 16. An output of the filter 16 is supplied to an accumulator 20. A check ball 19 may be arranged between the filter 16 and the accumulator 20. An output of the accumulator 20 passes through a heat sink 22 before being supplied to pressure control (PC) solenoids 28-1, 28-2, 28-3 and 28-4 (collectively PC solenoids 28).

An output of the PC solenoid 28-1 is fed to a flow control (FC) solenoid 30-1. An output of the FC solenoid 30-1 is fed to a clutch 34-1. A clutch position sensor (CPS) 36-1 senses a position of the clutch 34-1. In some implementations, the clutch 34-1 may be associated with odd gears of the DCT.

An output of the PC solenoid 28-2 is fed to a FC solenoid 30-2. An output of the FC solenoid 30-2 is fed to a clutch 34-2. A CPS 36-2 senses a position of the clutch 34-2. In some implementations, the clutch 34-2 may be associated with even gears of the DCT.

An output of a PC solenoid 28-3 is fed to a first logic valve 50-1. The output of the PC solenoid 28-3 is also fed to an FC solenoid 30-3. An output of the FC solenoid 30-3 is fed to the first logic valve 50-1. Outputs of the logic valve 50-1 are fed to a first fork actuator 52-1 and a second fork actuator 52-2, respectively. First and second fork actuators 52-1 and 52-2 include first and second pistons 54-1 and 54-2, respectively. First and second shift forks 56-1 and 56-2 are connected to ends of the first and second pistons 54-1 and 54-2, respectively. First and second fork position sensors 58-1 and 58-2 sense a position of the shift forks 56-1 and 56-2, respectively.

An output of a PC solenoid 28-4 is fed to a second logic valve 50-2. The output of the PC solenoid 28-4 is also fed to an FC solenoid 30-4. An output of the FC solenoid 30-4 is fed to the second logic valve 50-2. Outputs of the second logic valve 50-2 are fed to a third fork actuator 52-3 and a fourth fork actuator 52-4, respectively. Third and fourth fork actuators 52-3 and 52-4 include third and fourth pistons 54-3 and 54-4, respectively. Third and fourth shift forks 56-3 and 56-4 are connected to ends of the third and fourth pistons 54-3 and 54-4, respectively. Third and fourth fork position sensors 58-1 and 58-2 sense a position of the shift forks 56-3 and 56-4, respectively.

Various check balls 60-1, 60-2 and 60-3 may be used as shown in the hydraulic circuits supplying the clutches 34-1 and 34-2. A secondary logic valve solenoid 62 receives fluid from the check ball 60-1 and supplies fluid to the second logic valve 50-2 and the first logic valve 50-1) via the second logic valve 50-2).

In FIG. 2, a control module 80 communicates with the fork position sensors 58-1, 58-2, 58-3 and 58-4, the PC solenoids 28-1, 28-2, 28-3 and 20 8-4, the FC solenoids 30-1, 30-2, 30-3 and 30-4, the clutch position sensors 36-1 and 36-2, the first and second logic valves 50-1 and 50-2, the secondary logic valve 62 and the pressure sensor 24. The control module 80 controls positions of the clutches and shift forks using the FC solenoids 30 and PC solenoids 28 as will be described further below to effectuate shifting of the DCT. One or more speed sensors 90 may be used to sense speeds of an engine output shaft, output shafts of the clutches, intermediate shafts, layshafts and/or the transmission output shaft.

Figure 3:
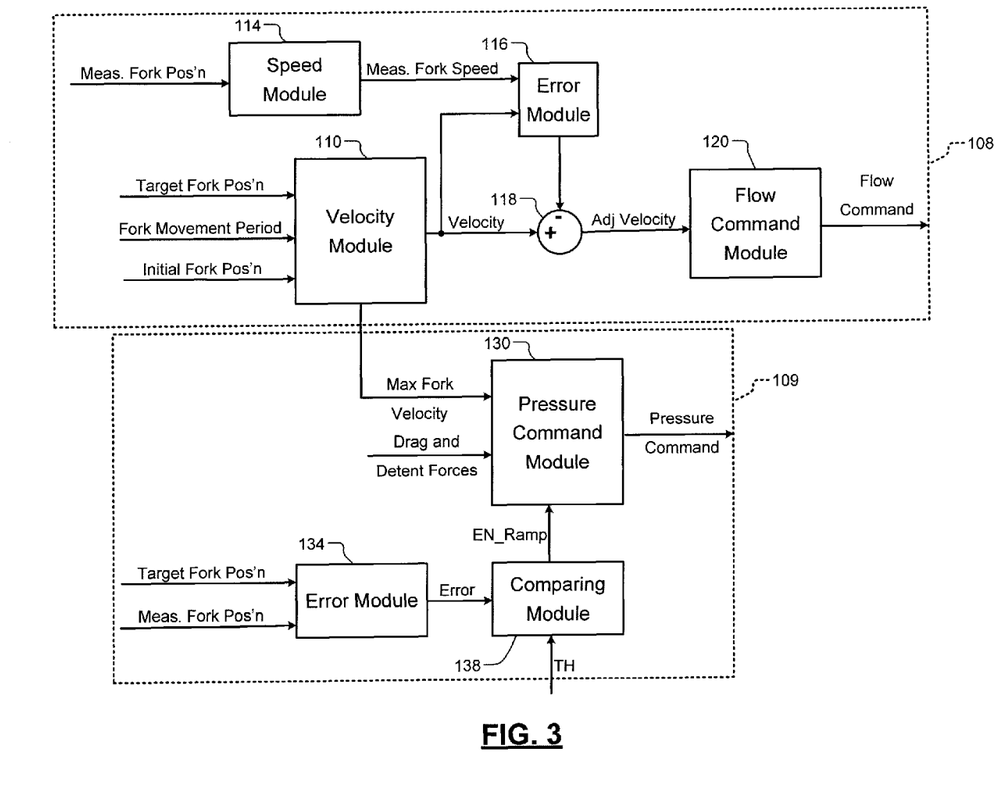
FIG. 3 is a functional block diagram of a flow determining module and a pressure determining module for solenoids that position with shift forks according to the present disclosure.

Referring now to FIG. 3, a flow determining module 108 and a pressure determining module 109 according to the present disclosure are shown. The flow determining module 108 includes a velocity module 110 that receives a target fork position, a fork movement period and an initial fork position. The velocity module 110 generates a fork velocity profile including a commanded fork velocity. A speed module 114 receives a measured fork position and generates a measured fork velocity. An error module 116 receives the measured fork velocity and the commanded fork velocity and generates an error velocity. In some implementations, the error module 166 uses a proportional integral derivative (PID) approach to generate the error velocity, although other approaches may be used.

The fork velocity and the error velocity are output to a summing module 118. The error velocity is subtracted from the fork velocity to generate an adjusted velocity. The adjusted velocity is output to a converting module 120 that converts the adjusted velocity to a flow command.

The pressure determining module 109 includes a pressure command module 130 that receives a maximum fork velocity from the velocity module 110. The pressure command module 130 further receives drag and detent forces and/or flow characteristics of the flow control solenoid and control fluid. The pressure determining module 109 further includes an error module 134 that receives target fork position and measured fork position. The error module 134 generates a fork error that is output to a comparing module 138. The comparing module 138 further receives a predetermined threshold. The comparing module 138 generates an enable ramp signal. When the error is less than the predetermined threshold, the pressure command module ramps the pressure command to zero.

Figure 4:
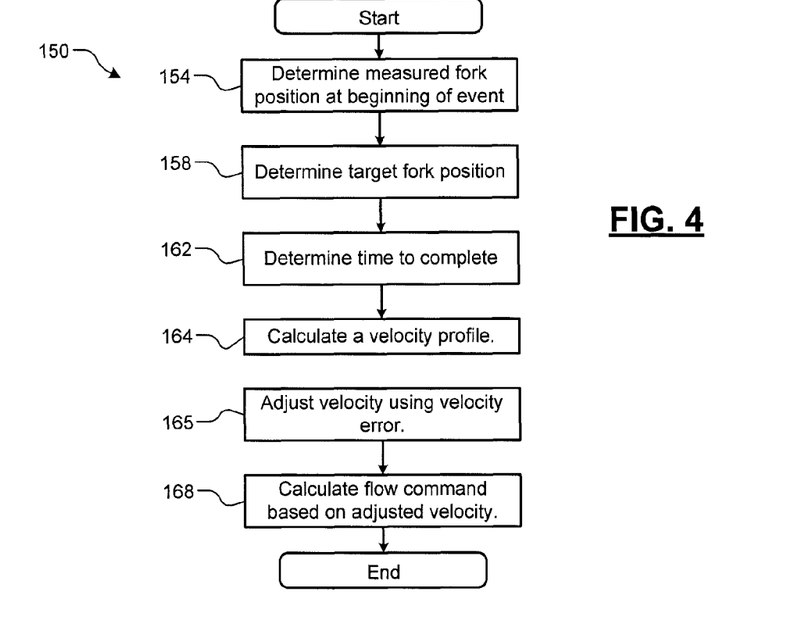
FIG. 4 is a flowchart illustrating a method for generating a flow command for a shift fork according to the present disclosure.

Referring now to FIG. 4, the flow command is calculated as follows. A velocity profile is calculated from the difference between the measured fork position at the beginning of the engagement or disengagement event, the targeted fork position, and the predetermined time to complete the fork movement.

The velocity profile includes a ramp to the maximum velocity, a substantially constant maximum velocity, and a ramp from maximum velocity to a final predetermined velocity. The lengths of the ramps are predetermined percentages of the total predetermined time. The maximum velocity is a function of the total time, ramp lengths, and the distance that must be traversed. The velocity command is modified by closed loop feedback control with the difference between measured fork velocity and commanded fork velocity as error. The flow command is based on the commanded velocity and the large side of the piston where:

$$\text{Velocity} * \text{area} = \text{flow}$$

In FIG. 4, a method 150 for determining a flow command is shown. At 154, a measured fork position is determined at the beginning of an event. At 158, a desired fork position is determined. At 162, time to complete the event is determined. At 164, a velocity profile is calculated. At 165, the velocity is adjusted by the velocity error. At 118, a flow command is calculated from the velocity profile.

Figure 5:
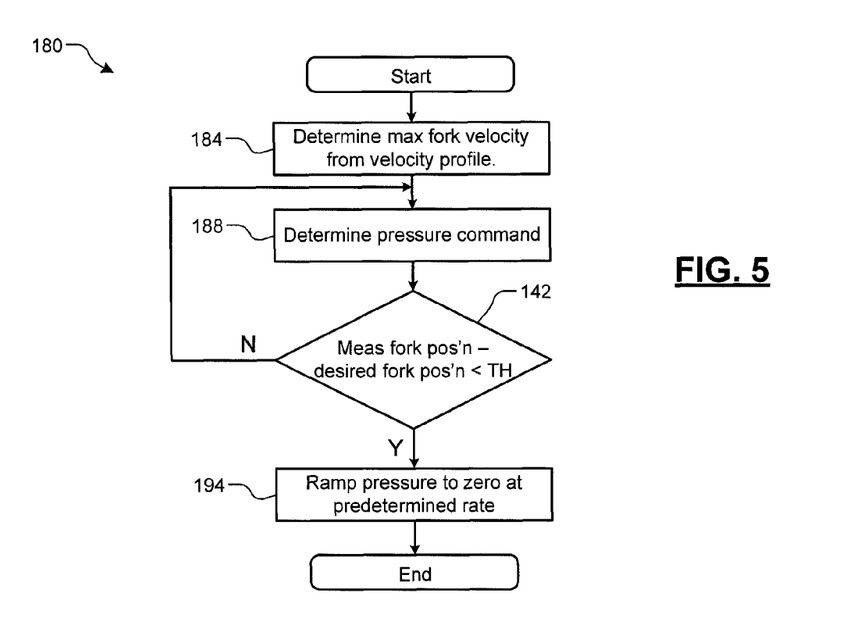
FIG. 5 is a flowchart illustrating a method for generating a pressure command for a shift fork according to the present disclosure.

Referring now to FIG. 5, a pressure command is calculated as follows. The pressure command is calculated as a function of the maximum fork velocity required, the flow characteristics of the control fluid and the solenoid, and the estimated drag and detent forces. When the difference between the measured fork position and the target fork position decreases below the predetermined threshold, the pressure begins to ramp to zero at a predetermined rate.

The present disclosure allows the use of a pressure control solenoid and a flow control solenoid in series for smoother control of the position the shift fork. The present disclosure also allows direct command of fork velocity through the flow command and better controllability of the shift fork. The present disclosure also reduces the amount of calibration time and effort that would otherwise be required. The present disclosure also provides the ability to command a desired shift time.

Controlling the fork velocity with the flow command according to the present disclosure allows for a smooth engagement or disengagement that completes in a timely manner without a banging noise at the end by reducing fork speed to zero near the end of movement. This control strategy also minimizes the calibration effort that is needed because the flow command is calculated from the predetermined movement time and pressure is calculated from the flow command and the predetermined time of movement.

In FIG. 5, a method 180 is shown. At 184, the maximum fork velocity is determined. At 188, a pressure command is determined. At 194, a difference between the measured fork position and the desired fork position is compared to a threshold. If the difference is greater than or equal to the threshold, control continues with 142. When the difference is less than the threshold, control ramps pressure to zero at a predetermined rate at 144.

Figure 6:
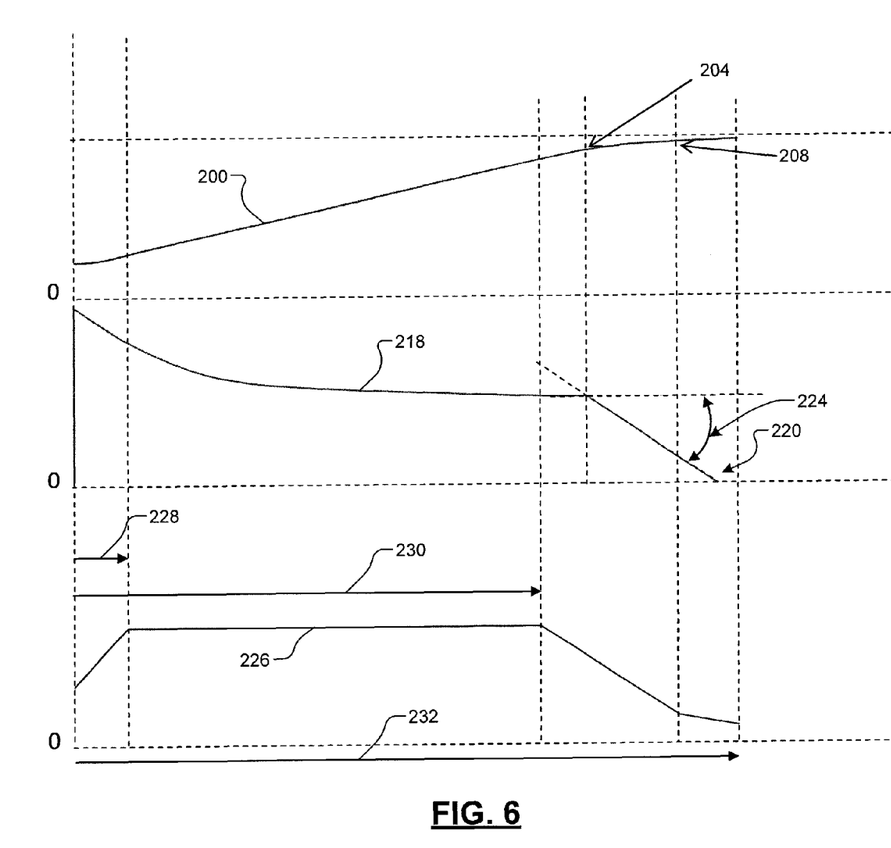
FIG. 6 illustrates pressure and flow commands during engagement according to the present disclosure.

Referring now to FIG. 6, fork position 200 is shown. The fork position starts from the synchronized position and moves to an engaged position. At 204, as the fork position is within a predetermined difference of the engaged position, the fork position responds to a decrease in pressure. At 208, fork position transitions to position control. The corresponding pressure command is shown at 218. The pressure command is intended to reach zero before the flow command to ensure that pressure is not trapped on either side of the corresponding piston. The detent force should halt the fork in position. When the fork position is within a predetermined difference of the engaged position, the pressure ramps to zero at a predetermined rate.

A percentage of total time required to reach maximum fork velocity is shown at 228. At 230, the percentage of total time to decrease to final fork velocity is shown. A corresponding flow command is shown at 226. The velocity profile starts at the velocity the fork is traveling after synchronization and therefore the flow command starts at a level that reflects the starting velocity. The time to complete the engagement event is shown at 232.

Figure 7:
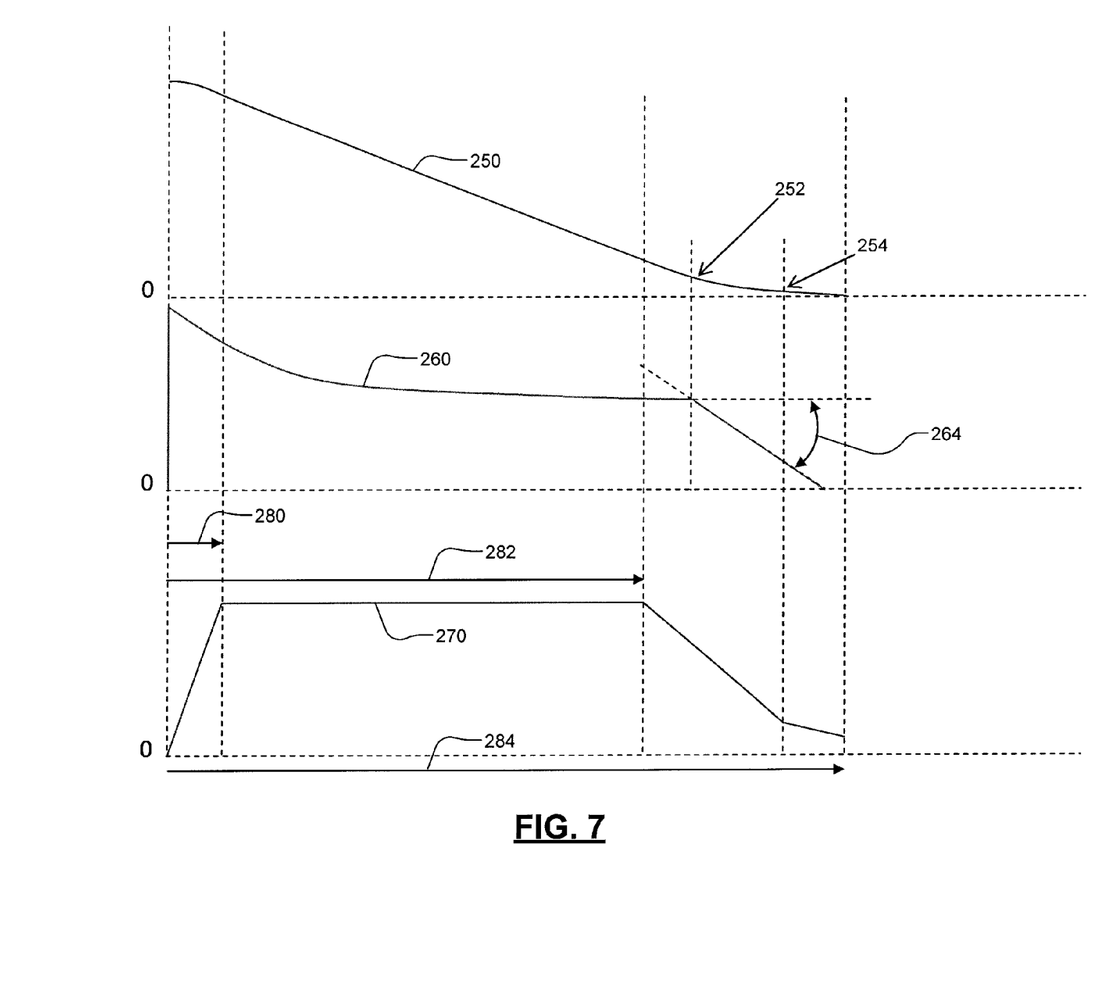
FIG. 7 illustrates pressure and flow commands during disengagement according to the present disclosure.

Referring now to FIG. 7, during disengagement, the fork position starts from the engaged position and moves to zero. The fork position is shown at 250. At 252, the fork position responds to a decrease in pressure that occurs when the fork is a predetermined distance from the final position. At 254, fork position responds to transition to position control. The pressure command is shown at 260. The pressure command is intended to reach zero before the flow command to ensure that pressure is not trapped on either side of the piston. The detent force should complete the neutralization. The pressure command decreases at a predetermined rate when the fork is a predetermined distance from the final position.

A percentage of the total time for the fork to reach maximum fork velocity is shown at 280. At 282, a percentage of total time to decrease to final fork velocity is shown. The flow command is shown at 270. The velocity profile starts at zero for disengagement because the fork is not moving when it is engaged. The time to complete the event is shown at 284.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system comprising:
   a pressure control solenoid;
   a flow control solenoid having an input in fluid communication with the pressure control solenoid;
   a piston that adjusts a position of a shift fork and that includes a first area in fluid communication with the pressure control solenoid and a second area in fluid communication with the flow control solenoid;
   a fork sensor that senses a position of the shift fork;
   a flow determining module that determines a fork velocity for the shift fork, that adjusts the fork velocity to generate an adjusted fork velocity based on the position of the shift fork, and that generates a flow command for the flow control solenoid based on the adjusted fork velocity; and
   a pressure determining module that generates a pressure command for the pressure control solenoid.

2. The control system of claim 1, wherein after the position of the shift fork is within a predetermined distance of a target fork position, the pressure determining module ramps the pressure command to zero at a predetermined rate.

3. The control system of claim 2, wherein the pressure command from the pressure determining module reaches zero before the flow command from the flow determining module.

4. The control system of claim 1, wherein the flow command includes a first portion that ramps to a maximum value, a second portion that is substantially constant at the maximum value, a third portion that ramps towards zero at a first rate and a fourth portion that ramps towards zero at a second rate that is different than the first rate.

5. The control system of claim 1, wherein the pressure determining module includes an error module that generates an error based on a difference between a target fork position and the position of the shift fork.

6. The control system of claim 5, further comprising:
   a comparing module that compares the error to a threshold and that generates a ramp enable signal,
   wherein the pressure determining module ramps the pressure command to zero at a predetermined rate in response to the ramp enable signal and wherein the pressure command reaches zero before the flow command.

7. The control system of claim 1, wherein the flow determining module generates a maximum fork velocity.

8. The control system of claim 7, wherein the pressure determining module generates the pressure command based on the maximum fork velocity, at least one of drag and detent forces and fluid characteristics of at least one of the pressure control solenoid and the flow control solenoid.

9. The control system of claim 1, wherein the second area is larger than the first area.

10. The control system of claim 1, wherein the shift fork is at least one of moved from a sync position to an engaged position and from an engaged position to a neutral position.

11. A method comprising:
    adjusting a position of a shift fork using a pressure control solenoid, a flow control solenoid, and a piston that includes a first area in fluid communication with the pressure control solenoid and a second area in fluid communication with the flow control solenoid;
    sensing the position of the shift fork;
    generating a fork velocity for the shift fork;
    adjusting the fork velocity to generate an adjusted fork velocity based on sensed fork position;
    generating a flow command for the flow control solenoid based on the adjusted fork velocity; and
    generating a pressure command for the pressure control solenoid.

12. The method of claim 11, further comprising ramping the pressure command to zero at a predetermined rate after the position of the shift fork is within a predetermined distance of a target fork position.

13. The method of claim 12, wherein the pressure command reaches zero before the flow command.

14. The method of claim 11, wherein the flow command includes a first portion that ramps to a maximum value, a second portion that is substantially constant at the maximum value, a third portion that ramps towards zero at a first rate and a fourth portion that ramps towards zero at a second rate that is different than the first rate.

15. The method of claim 11, further comprising generating an error based on a difference between a target fork position and the position of the shift fork.

16. The method of claim 15, further comprising:
    comparing the error to a threshold; and
    generating a ramp enable signal.

17. The method of claim 16, further comprising ramping the pressure command to zero at a predetermined rate in response to the ramp enable signal, wherein the pressure command reaches zero before the flow command.

18. The method of claim 11, further comprising generating the pressure command based on a maximum fork velocity, at least one of drag and detent forces and fluid characteristics of at least one of the pressure control solenoid and the flow control solenoid.

19. The method of claim 11, wherein the second area is larger than the first area.

20. The method of claim 11, further comprising moving the shift fork at least one from a sync position to an engaged position and from an engaged position to a neutral position.

* * * * *